Patented Aug. 1, 1939

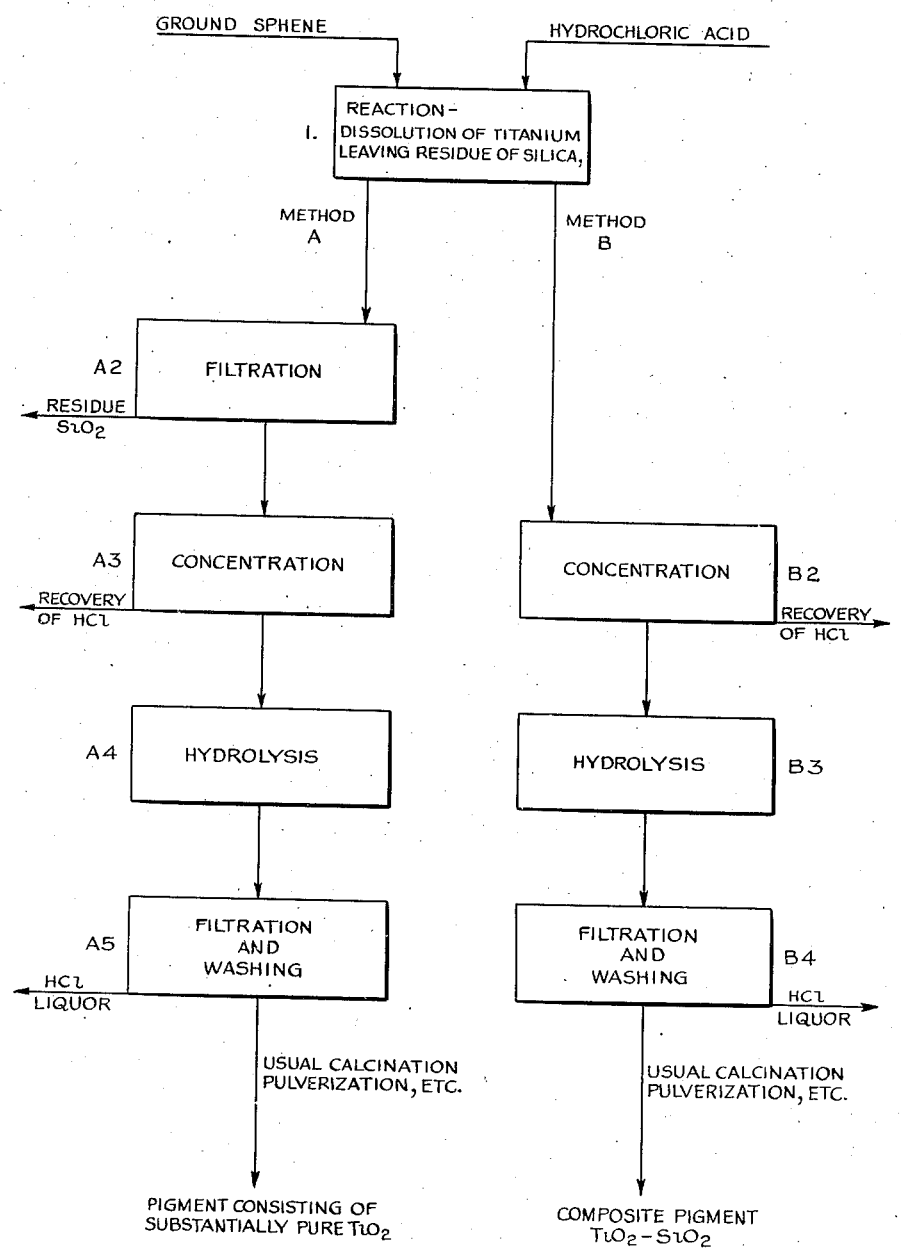

2,167,628

UNITED STATES PATENT OFFICE 2,167,628

PREPARATION OF TITANIUM DIOXIDE PIGMENTS

Hugh V. Alessandroni, New York, N. Y., assignor to National Lead Company, New York, N. Y., a corporation of New Jersey Application October 6, 1937, Serial No. 167,567

11 Claims. (Cl. 134—58)

The present invention relates to the preparation of titanium dioxide pigments from titano-silicate minerals.

In my co-pending application Serial No. 167,565, filed October 6, 1937, I have disclosed a method for preparing titanium dioxide pigments from a titano-silicate mineral, the salient features of which comprise the dissolution of a titanium-bearing mineral, e. g., sphene, with hydrochloric acid of a strength of above about 12 percent and preferably over 15 percent, the conversion of the resultant chloride solution containing the titanium values of the mineral into a sulfate solution by the addition of sulfuric acid and the removal, as by evaporation, of free hydrochloric acid. The sulfate solution is subsequently subjected to a thermal hydrolysis treatment to precipitate hydrous titanium oxide.

Titanium, although widely distributed throughout the world in vast quantities (it is the ninth most abundant element), has found but few commercial uses. As the dioxide, $TiO_2$, it is finding ever increasing use as a white pigment but this use is in no way proportionate to the vast quantities of the element available. Among the reasons why titanium has not found more general use is the highly refractive nature of titaniferous minerals which yield their titanium constituent only after exhaustive and expensive treatments. Consequently, those industries which find a use for titanium, particularly the titanium pigment industry have turned to ilmenite (commonly regarded as ferrous titanate, $FeTiO_3$) which is relatively easily sulfated to give water-soluble compounds of iron and titanium as a source of raw material and have almost completely neglected other titaniferous minerals. One such class of neglected minerals is that in which both titanium and silica are present in addition to other elements, particularly alkali and alkaline-earth metals, e. g., calcium and magnesium. The mineral sphene corresponding more or less to the formula $CaTiSiO_5$, is representative of this class. Minerals of this class of which there are large deposits would constitute a valuable source of titanium if economical and efficient methods of recovering the titanium values were devised. The present invention sets forth an economical and practical method of utilizing titano-silicate minerals in the preparation of titanium dioxide pigments.

The objects of my present invention are, therefore, among others, a complete process for the preparation of titanium dioxide pigments.

My invention may readily be appreciated by reference to the flow-sheet.

Ground titanium-bearing siliceous mineral, e. g., sphene, is mixed with hydrochloric acid of a strength preferably above 15 percent and heated. In the reaction which takes place, 1 of the figure, the titanium values and the other constituents which are soluble in hydrochloric acid, such as calcium and magnesium, are dissolved in the acid leaving a residue which is essentially silica.

When operating according to Method A of the figure, the residue is removed as by filtration (A2). The solution containing the titanium is then concentrated preferably in a vacuum evaporator to increase the content of dissolved $TiO_2$ and partially to remove HCl (A3). The concentrated solution is hydrolyzed which hydrolysis may be carried out in several ways, as will be later explained (A4). The hydrous titanium oxide obtained from the hydrolysis is filtered and washed (A5) and subjected to the usual after treatments including calcination and pulverization yielding a pigment consisting substantially of pure titanium dioxide.

When operating according to Method B of the figure, the procedure including the concentration (B2), the hydrolysis (B3), the filtration and washing (B4), and other subsequent treatments may be carried out in the same manner as under Method A. However, the removal of the silica residue is omitted and the final product consists essentially of a composite pigment of silica and titanium dioxide.

From the figure, it will be appreciated that many variations may be resorted to without departing from the scope of my invention. For instance, the hydrochloric acid recovered from the concentration steps A3 and B2 and the filtration and washing treatments A5 and B4 may be purified and concentrated and used again in the reaction step 1; to this extent making the operation a cyclical one. Furthermore, the silica residue from the filtration step (A2) may be purified and added to the process of Method B either before, during or after the hydrolysis to obtain a composite pigment somewhat higher in silica content than could be obtained on the basis of the contents of $SiO_2$ and $TiO_2$ present in the mineral. In addition, both Methods A and B lend themselves to the preparation of composite pigments in which extenders, for example, calcium sulfate, barium sulfate and the like, are associated with the titanium dioxide. In such variations of my invention the finely divided extender pigment is added to the process before, during or after the hydrolysis to obtain ultimately from Method A a secondary composite pigment of titanium dioxide and extender and from Method B a tertiary composite pigment of titanium dioxide, silica and extender.

The titano-silicate mineral, e. g., sphene, should be finely ground, say to a particle size of between about 100 and 200 mesh. The strength of the acid should be above about 12 per cent to, say about 30 per cent, and preferably between about 15 per cent and 20 per cent. The amount of acid employed should in all cases be at least sufficient to furnish enough acid molecules to combine with all elements present in the mineral which are capable of forming soluble non-hydrolyzable or hydrolyzable salts, i. e., sufficient hydrochloric acid to form chlorides of the calcium, magnesium, aluminum, titanium, etc., present in the mineral. However, to expedite the treatment of the mineral and to obtain the maximum yield of recoverable titanium in the shortest time it is desirable to use an excess of hydrochloric acid over that theoretically required, for instance, an excess of between about 10 per cent to 20 per cent HCl. The mixing of the ground mineral and hydrochloric acid may most conveniently be carried out at room temperature in the reaction vessel, which for the sake of economy ought to be equipped with a reflux condenser for catching, condensing and returning to the sphere of reaction the volatilized hydrochloric acid vapors.

The liquid mixture of acid and ground mineral is next heated at temperatures above about 40° C. to the boiling point of the liquid portion of the mixture. If no reflux condenser is employed the temperature should be maintained below the boiling point in order to conserve hydrochloric acid; with a reflux condenser the boiling temperature is to be preferred. In order to avoid losing free HCl, even when employing a reflux, it may be necessary to heat the reaction mixture for several hours between about 40° C. and 50° C. and during the next 25 hours gradually to raise the temperature to the boiling point. The heating is continued until a maximum recovery of titanium is obtained which may be determined by noting, from time to time, the decrease in free acidity of the reaction mixture, calculating therefrom the combined acid and comparing these figures with the analysis of the mineral, previously made.

When operating on titano-silicate minerals containing polyvalent elements, such as iron, which are more readily attacked by the acid in their condition of lowest valence or which in their condition of highest valence yield hydrolyzable salts but in their condition of lowest valence non-hydrolyzable salts, it is desirable to add to the reaction mixture and to carry out the reaction in the presence of a small amount, e. g., 1.0–2.0 per cent of a water-soluble reducing agent such as titanous chloride, $TiCl_3$, or stannous chloride, $SnCl_2$. However, in such cases the reducing agent should not be so large as to reduce any appreciable amount of titanium, it being known that other reducible elements, usually possible in admixture with titanium are preferentially reduced before the titanium.

After reaction, the solution will contain dissolved therein hydrolyzable chlorides, i. e., the titanium chloride, and non-hydrolyzable chlorides, i. e., the calcium, magnesium, aluminum, ferric, and other chlorides, some free hydrochloric acid and insoluble residue consisting primarily of silica. The solution is allowed to cool during which the siliceous residue settles.

If it be desired to operate according to Method A, the supernatant liquid portion of the reaction mixture is removed from the siliceous residue as by decantation or syphoning and the residue washed, e. g., on a suitable filter, with water or aqueous hydrochloric acid and the washings added to the liquid portion of the reaction mixture. When operating according to Method B the siliceous residue is not removed but the mixture delivered directly to the concentrator.

The liquid portion of the reaction mixture is relatively dilute with respect to the titanium content, containing in nearly every case below 5 per cent and usually between 2.0 per cent and 3.0 per cent titanium calculated as $TiO_2$. It is, however, relatively concentrated with respect to the hydrochloric acid content. Hence, these solutions are not readily hydrolyzable and must be subjected to a treatment by means of which the titanium content is increased to a ratio at which they are readily hydrolyzable. This treatment is most suitably carried out in a vacuum evaporator. At the ratio of $TiO_2$ to HCl is raised the capacity of the solution to hydrolyze is enhanced and the concentration should be continued until the ratio of $TiO_2$ to HCl is one best adapted for the particular type of hydrolysis treatment employed. I have found that by concentrating the solution to a $TiO_2$ content of above about 8.0 per cent $TiO_2$ and even to 20 per cent I have obtained readily hydrolyzable solutions. Solutions concentrated to about 10 to 12 per cent $TiO_2$ are most convenient regardless of the type of hydrolysis treatment employed.

Generally, the concentration of the solution should be carried on until the ratio of $TiO_2$ to HCl indicates the formation of a basic titanium chloride. Titanium solutions are said to contain or consist of basic titanium chloride when there is present less hydrochloric acid than corresponds to the formula of the normal titanium tetrachloride, $TiCl_4$.

Preferably, before the hydrolysis the solution should be subjected to a reducing treatment in the known manner to reduce any iron present in the solution to the ferrous condition and a small amount of titanium to the titanous condition. When the solution is ready after this treatment, the hydrolysis may be carried out in several ways:

First, the solution may be heated directly, e. g., boiled, to precipitate hydrous titanium oxide. In this case, however, the hydrous titanium oxide tends to precipitate in a colloidal unfilterable form. To overcome this disadvantage, the hydrolysis should be carried out in the presence of a very small amount, say between 0.01 per cent and 0.010 per cent based on the $TiO_2$ content of the solution, of a polyvalent, negative ion such as the phosphate, carbonate, sulfate, tartrate, oxalate, arsenate, etc., ions added to the solution as the acids or soluble, e. g., alkali-metal, salts of these ions.

Second, the hydrolysis may conveniently be carried out by mixing the solution to be hydrolyzed with a relatively large amount, say from two to four times the volume of the solution to be hydrolyzed of hot, even boiling, water containing a similar very small amount of a polyvalent negative ion and heating the mixture at the boiling point until substantially all the $TiO_2$ has been precipitated. I prefer this method because the hydrous titanium oxide precipitate thereby is easily filterable, has an excellent white color and the pigments obtained therefrom are of superior quality.

The hydrolysis therefore may be carried out as a straight thermal hydrolysis, by dilution of the titanium-containing solution or by a combination of these methods. It will be understood that the terms "hydrolyzing", "subjecting to hydrolysis", etc., as used in this description and in the appended claims refers to the precipitation of hydrous titanium oxide from the titanium-containing solution regardless how such precipitation is brought about.

The subsequent treatments such as the filtration and washing, the calcination, the pulverization, etc., to which the precipitates are subjected are carried out in the fashion well-known to this art. These precipitates may, according to my invention and as pointed out above, consist of substantially pure hydrous titanium oxide, hydrous titanium oxide plus silica, hydrous titanium oxide plus an extender pigment other than silica or hydrous titanium oxide, silica and another extender.

The following examples will illustrate my invention but the conditions set forth therein are not to be taken as fixing limits to the breadth thereof.

EXAMPLE NO. 1—PREPARATION OF SUBSTANTIALLY PURE TITANIUM DIOXIDE PIGMENT (Method A of figure)

One thousand pounds of sphene, ground so as to allow not more than 10 per cent retention on a 100 mesh screen, were stirred into 8300 lbs. of 29.5 per cent hydrochloric acid in a reaction vessel designed to accommodate a reflux condenser. The analysis of the sphene and the gram-equivalent of HCl per 100 grams of sphene were:

| Analysis of sphene | | Grams HCl equivalent to 100 g. sphene |
|---|---|---|
| Component | Percent | |
| MgO | 1.12 | 2.02 |
| CaO | 18.65 | 24.3 |
| SiO$_2$ | 29.58 | |
| TiO$_2$ | 32.00 | 58.4 |
| FeO | 1.43 | 1.45 |
| Fe$_2$O$_3$ | 4.20 | 5.75 |
| Al$_2$O$_3$ | 12.94 | 2..8 |
| MnO | 0.10 | 0.15 |

After fitting the reflux to the reaction vessel, the temperature of the mixture was raised to about 40° C. and maintained there for about 3–4 hours in order to avoid losing free HCl before appreciable reaction had taken place. Throughout the next 24 hours the temperature was gradually raised to the boiling point at about 107° C. The rate of reaction had become so low by the end of this time that the heating was discontinued, the reaction mixture allowed to cool while the siliceous residue settled. The residue was removed by filtration, it was washed with dilute hydrochloric acid and the washings added to the liquid portion of the reaction mixture.

The residue weighed about 372 lbs. It analyzed.

| | Pounds |
|---|---|
| SiO$_2$ | 327 |
| Fe$_2$O$_3$ | 25 |
| TiO$_2$ | 20 |

The filtrate and washings analyzed:

| | | |
|---|---|---|
| TiO$_2$ | lbs 300 | =( 3.0% soln.) |
| Free HCl | lbs 1420 | =(15.6% soln.) |
| CaCl$_2$ | lbs | 369 |
| Sp. gr | | 1.190 |
| Total weight | | 9100 |
| Yield TiO$_2$ | Per cent | 94 |

The liquid portion was subjected to the usual reducing treatment and then concentrated in a vacuum evaporator at about 50° C. until the titanium had been raised from about 3.0 per cent to about 11.0 per cent, calculated as TiO$_2$. After concentration the solution was poured into a volume of boiling water three times that of the solution itself. The boiling water contained a quantity of oxalic acid about 0.05 per cent of the TiO$_2$ contained in the solution. The mixture was brought to the boiling point in an apparatus provided with an outlet for the recovery of hydrochloric acid and maintained at this point until about 95 per cent of TiO$_2$ was precipitated as hydrous titanium oxide. The precipitated hydrous titanium oxide was filtered, washed, calcined and pulverized according to practices prevalent in the art. The resulting pigment consisted of substantially pure rutile titanium dioxide; it had an excellent white color, high tinting strength and in other respects was excellently adapted for all pigmentary uses.

EXAMPLE NO. 2—PREPARATION OF A COMPOSITE TITANIUM DIOXIDE-SILICA PIGMENT (Method B of figure)

In this example a sphene especially selected for substantial freedom from iron oxides was employed. The procedure was the same as described under Example No. 1 with the exception that separation of the siliceous residue resulting from the hydrochloric acid treatment of the ground mineral was omitted.

The product obtained was a white pigment consisting of substantially all the silica contained in the sphene and about 93 per cent of the titanium dioxide characterized by rutile crystalline structure.

From the above description of my invention it will be seen that many variations may be resorted to without departing from its scope. Likewise the pigments obtained therefrom are capable of being used in many different fields. With film-forming vehicles they make excellent surface coating compositions, characterized by high covering power. The film-forming vehicles which may be used in connection with the pigments of the present invention included the usual oleaginous or oleoresinous type or may be of the nitrocellulosic or cellulose acetate type. They may be also employed to opacify and brighten paper either as a filler or as a coating material. They may be used as fillers for rubber or plastics generally. In fact, they find use wherever titanium dioxide pigments of the prior art have been employed.

This description of my invention has been given for clearness of understanding and no undue limitation should be deduced therefrom but the appended claims should be construed as broadly as possible in view of the prior art.

I claim:

1. A process for the preparation of titanium dioxide pigments from titano-silicate minerals which comprises grinding a titano-silicate mineral, mixing the ground mineral with aqueous hydrochloric acid having a concentration above 12 percent, heating the mixture at temperatures above 40° C. to the boiling point thereof while maintaining constant the acid volume until substantially all the constituents of the said mineral which are capable of forming hydrolyzable and non-hydrolyzable hydrochloric acid-soluble chlorides are dissolved in the hydrochloric acid, evaporating the resultant solution until the same is readily hydrolyzable, hydrolyzing the said solution in order to precipitate the titanium contained therein as hydrous titanium oxide, washing, calcining and pulverizing the same.

2. A process for the preparation of titanium dioxide pigments from titano-silicate minerals which comprises grinding a titano-silicate mineral, mixing the ground mineral with aqueous hydrochloric acid having a concentration between about 15 percent and about 30 percent, heating the mixture at temperatures above 40° C. to the boiling point thereof while maintaining constant the acid volume until substantially all the constituents of the said mineral which are capable of forming hydrolyzable and non-hydrolyzable hydrochloric acid-soluble chloride are dissolved in the hydrochloric acid, evaporating the resultant solution until the titanium content, calculated as $TiO_2$, is between about 8 percent and about 20 percent, hydrolyzing the resulting solution in order to precipitate the titanium contained therein as hydrous titanium oxide, washing, calcining and pulverizing the same.

3. A process for the preparation of titanium dioxide pigments from titano-silicate minerals which comprises grinding a titano-silicate mineral, mixing the ground mineral with aqueous hydrochloric acid having a concentration between about 15 percent and about 30 percent, heating the mixture at temperatures above 40° C. to the boiling point thereof while maintaining constant the acid volume until substantially all the constituents of the said mineral which are capable of forming hydrolyzable and non-hydrolyzable hydrochloric acid-soluble chloride are dissolved in the hydrochloric acid, separating the resultant solution from any insoluble residual siliceous constituents of the mineral, evaporating the solution until the titanium content, calculated as $TiO_2$, is between about 8 percent and about 20 percent, hydrolyzing the resulting solution in order to precipitate the titanium contained therein as hydrous titanium oxide, washing, calcining and pulverizing the same.

4. A process according to claim 3 in which the insoluble residual siliceous constituents separated from the chloride-containing solution are purified and the resultant purified silica reintroduced into the process at a stage subsequent to the separation of the said residual siliceous constituents ultimately to form a composite pigment consisting substantially of titanium dioxide and silica.

5. A process according to claim 3 in which the insoluble residual siliceous constituents separated from the chloride-containing solution are purified and the resultant purified silica reintroduced into the process together with another extender pigment at a stage subsequent to the separation of the said residual siliceous constituents ultimately to form a composite pigment consisting substantially of titanium dioxide, silica and extender pigment.

6. Process according to claim 1 in which the ground titano-silicate mineral and hydrochloric acid are heated while admixed with a small amount of a hydrochloric acid-soluble reducing agent.

7. Process according to claim 1 in which the ground titano-silicate mineral and hydrochloric acid are heated while admixed with a small amount of a reducing agent selected from the group consisting of titanous chloride and stannous chloride.

8. Process according to claim 1 in which the hydrochloric acid solution containing the hydrolyzable and non-hydrolyzable constituents of the titano-silicate mineral is hydrolyzed while admixed with a small amount of a hydrochloric acid soluble compound the negative ion of which is polyvalent.

9. Process according to claim 1 in which the hydrochloric acid solution containing the hydrolyzable and non-hydrolyzable constituents of the titano-silicate mineral is hydrolyzed while admixed with a small amount of a hydrochloric acid soluble compound the negative ion of which is selected from the group consisting of the phosphate, carbonate, sulfate, tartrate, oxalate, and arsenate ions.

10. Process according to claim 2 in which the ground titano-silicate mineral and hydrochloric acid are heated while admixed with a small amount of a hydrochloric acid-soluble reducing agent.

11. Process according in claim 2 in which the hydrochloric acid solution containing the hydrolyzable and non-hydrolyzable constituents of the titano-silicate mineral is hydrolyzed while admixed with a small amount of a hydrochloric acid soluble compound the negative ion of which is polyvalent.

HUGH V. ALESSANDRONI.